Dec. 3, 1929.  A. S. CLARK  1,738,357
CYLINDER MOLD
Filed Dec. 8, 1928
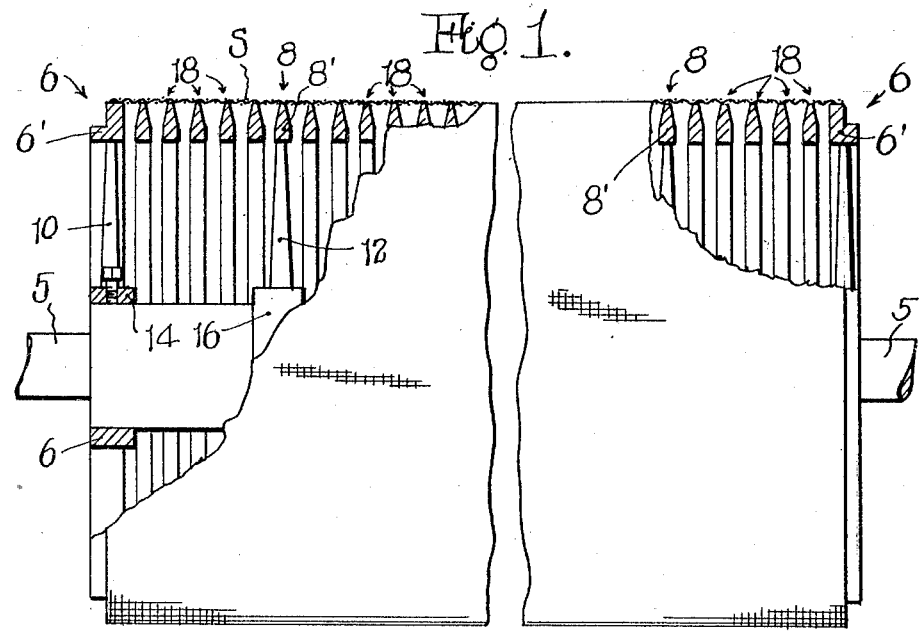
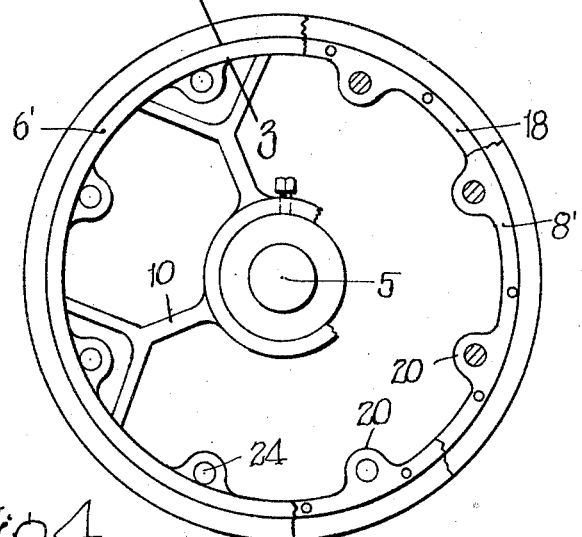
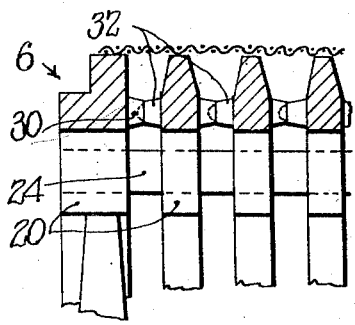
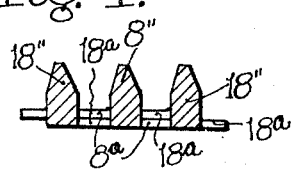
INVENTOR.
Alvan S. Clark
BY Watter C. Ross
ATTORNEY Patented Dec. 3, 1929

1,738,357

UNITED STATES PATENT OFFICE

ALVAN S. CLARK, OF HOLYOKE, MASSACHUSETTS

CYLINDER MOLD

Application filed December 8, 1928. Serial No. 324,718.

This invention relates to improvements in cylinder molds used in the manufacture of paper and one of its objects is to provide a cylinder mold having a series of rings provided with circumferential surfaces to carry a wire screen cloth or foraminous wall, so as to eliminate the use of helically wound wire and externally locked supporting rods therefor.

With the above and numerous other objects in view, the invention relates to certain new and useful constructions, combinations and arrangements of parts, clearly described in the following specification and fully illustrated in the accompanying drawings, in which Fig. 1 is a side elevation of a mold apparatus of the invention with parts in section.

Fig. 2 is an end elevational view of the apparatus shown in Fig. 1.

Fig. 3 is a sectional view taken on the line 3—3 of Fig. 2.

Fig. 4 is a view similar to Fig. 3 showing a modified form of the invention.

In the construction of the standard cylinder mold in common use a frame work is built up consisting of a shaft, a series of rings having integral arms or spokes connected to a hub mounted on the shaft, rods extending longitudinally of the cylinder and having its contacting portions embedded in grooves formed on the rings, a covering of wire helically wound on the longitudinal rods and the wire cloth or screen mounted on the helically wound wire. In use these cylinder molds develop various difficulties, partly due to the propelling action of the wire upon the the cylinder frame and the friction between the turns of the wire while displacement takes place in actual practice between the turns of the wire which effect the suctional pull through the wire of the cylinder so that inefficient service thus results.

In my present invention I provide a cylinder mold construction wherein the use of helically disposed wire turns is omitted and greater clearance is provided between the supports which carry the screen cloth.

Referring to the accompanying drawings, the invention will now be described.

A shaft is represented at 5 which has secured thereto in some suitable manner end rings 6 and intermediate spiders 8. These end and intermediate spider rings 6 and 8 consist of circumferential ring-like bands or ring frames 6' and 8' connected by spokes 10 and 12 to hubs 14 and 16 which are secured to the shaft 5. Between the intermediate spiders 8 and between the endmost spiders and end rings 6 there are a plurality of spacer rings 18 which are in the form of a circular band or annulus.

The sides of the rings including the end, the intermediate and the spacer rings are provided with outwardly projecting bosses 30 and 32 disposed in a spaced relation which have interfitting surfaces as best shown in Fig. 3. These bosses function to align the parts and prevent a relative shifting movement thereof as well as to hold the rings in the spaced relation shown.

Circumferentially spaced apart bosses 20 extend inwardly from the bands 6' and 8' of the end and intermediate rings as well as from the spacer rings 18 and are suitably apertured to receive tie rods 24 which may be secured to the endmost rings and also if desired to the intermediate rings and spacer rings as by brazing or welding so as to hold the parts against shifting. The various rings will of course be pressed together in assembling the parts so that when the end rings are secured to the rods there will be provided a firm rigid structure.

The sides of the various rings are preferably bevelled to provide relatively narrow outer circumferential bearing surfaces as shown. Thus with the rings spaced apart there is provided alternate circumferential slots and bearing surfaces for supporting a layer of wire mesh, while the slots provide suction passages.

The ring frames 8' and the rings 18 are preferably made of cast material as it has been found through extensive practice that cast bronze or other corrosion resisting metal is capable of successfully resisting the acids used in paper making for a greater length of time and that the effective life of a cylinder mold with parts formed of cast bronze or the like is many times the effective life of drawn wire or tubing.

In practice any number of rings 18 are locked between each pair of spiders 8 and over these spaces between the rings and in bearing contact with the outer peripheral faces of the ring frames and the rings a screen cloth S is mounted in the customary manner.

According to the embodiment of the invention shown in Fig. 4 the ring-like bands 8″ and rings 18″ are provided with outwardly extending lugs 8ª and 18ª which are spaced about the circumference thereof. These are arranged so that the lugs of each ring will overlie the lugs of the next adjacent rings and at the same time abut the next adjacent ring. According to one feature of the invention the overlapping lugs are brazed or welded so as to tie the parts together in their spaced relation. This construction may be used in lieu of the rods 24 and bosses previously described and when the end rings and spiders are secured to the shaft provides a strong rigid structure since the rings and spiders are tied to the adjacent rings and spiders.

In practice any desired number of rings 18 may be disposed between the intermediate spiders.

It has been found that in connection with the cylinder mold having longitudinal rods laid upon the faces of the spiders and equipped with helically wound wire that the paper web produced varies in thickness throughout the different zones of the paper, due to interference of the longitudinal rods of helically wound wire to the suction action in withdrawing moisture from the web and that on exposure to light the dry web reveals the locations where the rods and helical wire turns interferred with the formation of the paper web.

It is seen that I have produced a cylinder mold having a non-helical supporting surface and that when the screen cloth has been placed over this non-helical supporting surface, built up of ring-like members having practically no tendency to elongate and very little resiliency and being substantially rigid and non-yielding, the paper or suction will be uniformly distributed against the web or pulp and a more efficient formation of the web will result.

Also it will be noted that the supporting surface for the wire cloth is what may be termed a cast surface which is not subject to corrosive action and that thereby the openings through the screen cloth are free at all times.

Having described my invention, I claim:

1. A cylinder mold comprising in combination, a central supporting shaft, rings fixed thereto, a plurality of spacer rings therebetween, said rings including ring-like bands having outer bearing surfaces for supporting a wire screen cloth and members at the sides of the bands spaced circumferentially thereof for abutting a part of the next adjacent band for spacing said bands.

2. A cylinder mold comprising in combination, a central supporting shaft, end and spider rings fixed thereto and spacer rings therebetween, the said spider and spacer rings including ring-line bands having their opposite sides disposed in a converging relation to provide circumferential wire cloth supporting surfaces which are narrower than the main body of the bands and diverging passageways between the bands and parts at the sides of the ring-like bands for spacing them.

3. A cylinder mold comprising in combination, a central supporting shaft, ring members fixed thereto having ring-like bands, rings including ring-like bands therebetween, the said bands having lugs at the sides thereof and spaced therearound, the said lugs of one ring arranged in overlapping relation with those of an adjacent ring and secured together and in abutting relation with the side of an adjacent ring whereby the rings are held in spaced relation.

In testimony whereof I affix my signature.

ALVAN S. CLARK.